Oct. 28, 1930.                J. B. NEAL                 1,779,614
                        SALT AND PEPPER SHAKER
                          Filed Feb. 11, 1928

INVENTOR
JAMES B. NEAL
BY Newell + Spencer
ATTORNEY

Patented Oct. 28, 1930

1,779,614

UNITED STATES PATENT OFFICE

JAMES B. NEAL, OF LOCKPORT, NEW YORK, ASSIGNOR TO NORTON LABORATORIES, INC., OF LOCKPORT, NEW YORK, A CORPORATION OF MAINE

SALT AND PEPPER SHAKER

Application filed February 11, 1928. Serial No. 253,537.

This invention relates to salt, pepper and similar shakers and particularly to such shakers having a removable closure in which means is provided for preventing spilling of the contents upon removal of the closure.

It is well known that salt and pepper shakers are very often confused particularly when the shakers are of the same design and formed of opaque material so that the contents of each shaker cannot be seen. Salt and pepper shakers are also apt to spill their contents when opened or the parts are separated so that the salt is scattered about.

It is an object of the invention to provide a novel construction of parts which will prevent spilling of the contents of the shaker when the parts are separated.

The invention will be more clearly understood by reference to the accompanying drawings, in which—

Figure 1:
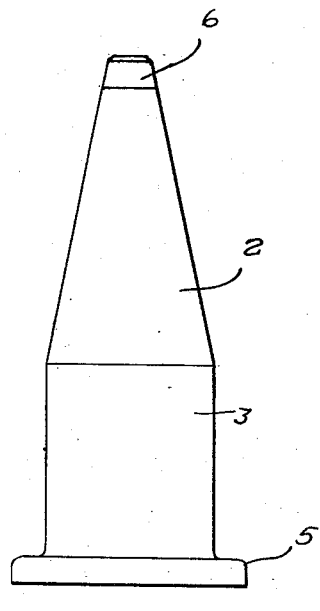
Figure 2:
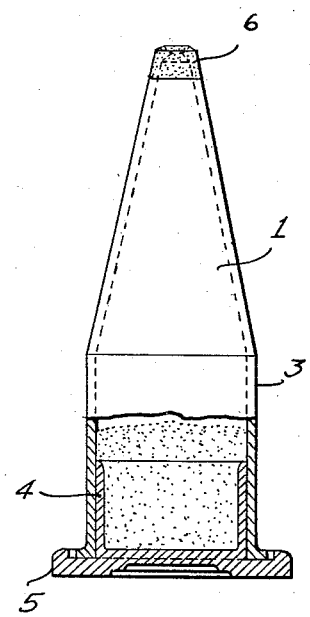
Figure 3:
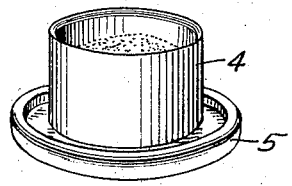

Figures 1 and 2 illustrate salt and pepper shakers embodying the present invention; and Figure 3 is a perspective of the base forming closure for the shakers.

In the salt and pepper shakers shown in the drawings the shaker 1 is for salt and the shaker 2 is for pepper. Each shaker is shown as consisting of a hollow body portion 3 formed of bakelite, hardened resin material or other suitable material from which the salt shaker is to be formed. The material is preferably molded and may be colored and shaped as desired.

The upper end or top 6 of the shaker is formed with one or more apertures through which the contents of the shaker may be shaken. In the case of the salt shaker 1, the top 6 is preferably colored with some distinguishing color e. g. white, while the top of the pepper shaker 2 may be given some contrasting color, such as black. The particular colors employed should be contrasting, so as to readily enable one to distinguish each shaker according to its contents and avoid confusion in their use.

The colored top portion of each shaker is preferably formed of the same material as the body portion and is integral therewith, forming a pleasing and contrasting color effect which at the same time serves to indicate the contents of the shaker. The amount and color of the material used in the top may be varied but it is preferable that the colored portion be restricted to the top of the shaker so that it will not detract from the color effect or design of the shaker as a whole. For this reason it is preferable to limit the coloring material to the upper one-fourth or less of the shaker.

The shakers of my invention are formed with a closure at its base which is in the shape of a cylindrical or cup-shaped portion 4 having a flat bottom or stand 5. The cylindrical portion of the closure is adapted to telescope with the hollow body portion 3 and engages, preferably frictionally, the inner surface of the body 3 of the shaker.

Ordinarily when shakers of the kind described are opened to refill the same there is a small amount of salt or pepper still remaining in the shaker which is spilled and scattered about as soon as the parts are separated. The cylindrical portion 5 of the closure members extends upwardly into the body portion 3 of the shaker, forming a cup-shaped portion which holds the salt or pepper remaining in the shaker, so that when the parts are separated to refill the same the contents of the shaker will not be spilled.

From the foregoing description it will be seen that the invention provides attractive and novel salt and pepper shakers which can be distinguished readily, thus avoiding the usual confusion and annoyance and which can be refilled without the annoyance of having the contents wholly or partially spilled.

What is claimed as new is:

1. A salt or pepper shaker comprising a hollow body portion formed of molded bakelite and having a perforated top characteristically colored, a closure for said hollow body forming a base for said shaker and provided with a cylindrical portion slidable longitudinally within said hollow body portion so as to form a holder to prevent the contents of said shaker from being spilled when the base and body portion are separated from each other.

2. A shaker for salt, pepper and the like comprising a hollow body portion, a closure for said hollow body forming a base for said shaker and provided with a cylindrical portion slidable longitudinally within said hollow body portion so as to form a holder to prevent the contents of said shaker from being spilled when the base and body portion are separated from each other.

Signed at Lockport, N. Y., this 8th day of February, 1928.

JAMES B. NEAL.